(12) United States Patent
Toyama et al.

(10) Patent No.: US 7,475,060 B2
(45) Date of Patent: Jan. 6, 2009

(54) BROWSING USER INTERFACE FOR A GEO-CODED MEDIA DATABASE

(75) Inventors: Kentaro Toyama, Redmond, WA (US); Asta Roseway, Redmond, WA (US); Ron Logan, Everett, WA (US)

(73) Assignee: Planeteye Company ULC, Toronto, Ontario (CA)

( * ) Notice: Subject to any disclaimer, the term of this patent is extended or adjusted under 35 U.S.C. 154(b) by 415 days.

(21) Appl. No.: 10/686,966

(22) Filed: Oct. 16, 2003

(65) Prior Publication Data
US 2004/0225635 A1    Nov. 11, 2004

Related U.S. Application Data

(60) Provisional application No. 60/469,314, filed on May 9, 2003.

(51) Int. Cl.
*G06F 17/30*    (2006.01)
(52) U.S. Cl. .......................................... 707/3; 707/102
(58) Field of Classification Search ................ 707/1–5, 707/104.1, 100, 102; 345/619, 649–652, 345/655, 676, 440, 520; 715/818; 434/153
See application file for complete search history.

(56) References Cited

U.S. PATENT DOCUMENTS

| | | | |
|---|---|---|---|
| 5,822,751 A | 10/1998 | Gray et al. | |
| 6,307,573 B1* | 10/2001 | Barros | 715/764 |
| 6,308,177 B1 | 10/2001 | Israni et al. | 707/100 |
| 6,700,574 B1 | 3/2004 | Song | 345/423 |
| 7,036,085 B2* | 4/2006 | Barros | 715/764 |
| 2003/0115207 A1* | 6/2003 | Bowman et al. | 707/100 |
| 2004/0073538 A1* | 4/2004 | Leishman et al. | 707/3 |
| 2004/0119759 A1* | 6/2004 | Barros | 345/853 |
| 2004/0230371 A1* | 11/2004 | Vincent et al. | 701/200 |

OTHER PUBLICATIONS

Steed, Braud and Koehler (2002). VGRID: A Generic, Dynamic HDF5 Storage Model for Environmental, Grid Data, *Presented at the Oceans 2002 Conference and Exhibition*, Biloxi, MS. NRL/PP/7440-02-1003, Oct. 29-31.

European Search Report, Application No. EP4008439.4, completed Mar. 10, 2006, received Mar. 17, 2006.

Bahl, P. and V. N. Padmanabhan, Radar: An in-building RF-based location and tracking system, *IEEE INFOCOM 2000*, 2000, Tel-Aviv, Isreal.

Bederson, B. B., Quantum treemaps and bubblemaps for a zoomable image browser, *CHI Letters*, 2001, vol. 3, No. 2, pp. 71-80.

(Continued)

*Primary Examiner*—Cheryl Lewis
(74) *Attorney, Agent, or Firm*—Wiley Rein, LLP (57) ABSTRACT

The invention is a user interface for browsing a database of media that is tagged by geographic location information including photos, videos, and panoramas. Interchangeable panels are used for determining query constraints and viewing query results, grid-aligned media dots indicate how many media should be associated with a location on a map, and a reflective UI shows how query constraints and query results are related through cursor interaction.

19 Claims, 7 Drawing Sheets
(6 of 7 Drawing Sheet(s) Filed in Color)

OTHER PUBLICATIONS

Cadiz, J. J., G. Venolia, G. Jancke, and A. Gupta, Designing and deploying an information awareness interface, *Proc. CSCW*, 2002, pp. 314-323.

Christel, M. G., A. M. Olligschlaeger, and C. Huang, Interactive maps for a digital video library, *IEEE Multimedia*, 2000, vol. 7, No. 1, pp. 60-67.

Diomidis, D. S., Position-annotated photographs: A geotemporal web, *IEEE Pervasive Computing*, 2003, vol. 2, No. 2, pp. 72-76.

Dutton, G., Encoding and handling geospatial data with hierarchical triangular meshes, *Advances in GIS Research II* (Proc. SDH7, Delft, Holland), London: Taylor & Francis, pp. 505-518.

Duygulu, P., K. Barnard, N. de Freitas, and D. Forsyth, Object recognition as machine translation: Learning a lexicon for a fixed image vocabulary, *Proc. European Conf. on Comp. Vision*, 2002, vol. IV, pp. 97-112.

Gemmell, J., G. Bell, R. Lueder, S. Drucker, and C. Wong, MyLifeBits: Fulfilling the Memex vision, *Proc. ACM Multimedia*, 2002, pp. 235-238.

Kimber, D., J. Foote, and S. Lertsithichai, FlyAbout: Spatially indexed panoramic video, *Proc. ACM Multimedia*, 2001, pp. 339-347.

Lieberman, H., and H. Liu, Adaptive linking between text and photos using common sense reasoning, *Proc. of the $2^{nd}$ Int'l. Conf. on Adaptive Hypermedia and Adaptive Web-Based Systems*, 2002, pp. 2-11.

Mainichi Daily News, http://mdn.mainichi.co.jp/news/archive/200203/21/20020321p2a00m0fp003000c.html, Mar. 21, 2002.

North, C., and B. Shneiderman, A taxonomy of multiple window coordinates, University of Maryland, Dept. of Computer Science Technical Report, #CS-TR-3854, 1997.

Rigaux, P., M. Scholl, A. Voisard, *Spatial Databases with Application to GIS*, Morgan Kaufmann, 2002.

Sahr, K., and D. White, Discrete global grid systems, *Proc. $13^{th}$ Symp. Interface, Comp. Sci. & Stat.*, 1998, pp. 269-278.

Smeulders, A. W. M., M., Worring, and S. Santini, Content-based image retrieval at the end of the early years, *IEEE Trans. PAMI*, Dec. 2002, vol. 22, No. 12, pp. 1349-1380.

\* cited by examiner

BROWSING USER INTERFACE FOR A GEO-CODED MEDIA DATABASE

BACKGROUND

This application claims priority under 35 U.S.C. Section 119(e)(1) of provisional application No. 60/469,314, filed May 9, 2003.

TECHNICAL FIELD

This invention is directed toward a user interface for accessing media data. More specifically, the invention is directed toward a user interface for browsing and viewing a database of media that is tagged with geographic location information.

BACKGROUND ART

Digital media and location-aware devices are rapidly entering the mainstream, resulting in an increasing number of digital media documents that are tagged by their geographic location ("geocoding").

Geographic Information Systems (GIS) are well-organized databases of information catalogued, in part, by their relationship to geography. Often, these databases contain on the order of millions or billions (or more) of data elements, each of which is associated with a particular geographical location. As an example, consider a world-wide photo database, where each photograph is associated with the location where it was taken. Retrieving data from such a large database requires users to specify multidimensional constraints or queries.

This type of multi-dimensional search is complicated for the user. For example, in a photo database, items maybe searched by time, photographer, geographic location, image size, keywords, and so forth. Along the geographic axis, an item may be associated with the city of New York as a whole or more specifically with the city block representing the Empire State Building. In certain kinds of queries, it may be useful to retrieve all items taken at the Empire State Building when querying for photos taken in New York City, but the converse may be undesirable—not all photos taken in New York City will be relevant to a query about the Empire State Building.

Another issue with respect to geographic media databases concerns displaying the media elements to a user. There are many ways in which image media can be represented on a map, and there is ongoing research on cartographic visualizations. Cartographic visualization borrows heavily from both traditional cartography as well as from more recent advances in scientific visualizations which stress the importance of allowing pre-attentive visual cues, such as color, size, intensity, or density of iconic elements, to aid comprehension. Thumbnails of media displayed directly on the map offer an immediate juxtaposition of image and location that is colorful and reminiscent of tourist maps, but this approach has limited location resolution. Another possibility is to represent individual items by small dots or fixed-size icons; known as "dot maps" this seems to be the most popular choice for display of items on a map. In this case, precision of location information is high, and the variable density of dots conveys information about the amount of available imagery at a location. However, dot maps have difficulty as the number of items increases, both visually and in computational performance. As the map is covered with image items, the underlying map becomes wholly occluded, and the dots take a proportionately longer time to draw. With respect to continuous displays, it is possible to use an isopleth map in which variation in hue, intensity, or saturation (modulated by transparency so as not to occlude the underlying map) indicates the density of image items available at a location. This solves the scaling issue, but continuous mapping does not convey the fundamental discreteness of the items (e.g., images) being represented. In addition, it is difficult in practice to maintain a uniform look over different maps which come with varying color schemes and borders. Traditional GIS systems will partition a map according to man-made political or geographical borders, assigning a value to each. Although highly intuitive, these methods require intimate interaction with the underlying map data, from which one would prefer to be independent to allow map interchangeability. In addition, they require additional manipulations to scale well, as geographic boundaries relevant at one scale become too small or too large at other scales.

Therefore, what is needed is a user interface that allows a user to effectively and intuitively query and display media in a database that contains geo-coded database entries.

SUMMARY

The invention is directed toward a user interface (UI) for browsing a database of media that is tagged by geographic location information including photos, videos, panoramas, and other types of digital media. Interchangeable panels are used for determining query constraints and viewing query results. Grid-aligned media dots indicate how many media elements should be associated with a location on a map. A reflective UI shows how query constraints and query results are related through cursor interaction.

The interchangeable panels of the invention employ one or more constraint panels and one or more display panels. The constraint panels allow a user to define the constraints of a database query. In one embodiment, these constraint panels include one or more of: a map related to the location where a database item was captured; a timeline related to a significant event corresponding to a database item; a person related to a database item, such as its creator; a keyword related to a database item (e.g., such as may be found in associated metadata); and the media type of a database item. In a preferred embodiment, navigation in the constraint panels invokes new queries; however, the constraint panels may also include a float mode that can be invoked that allows a user to navigate a constraint panel without eliciting a database query.

The display panels of the invention show the results a database query that is jointly specified by one or more of the constraint panels. The display panels can include: a full view panel that brings a database item to full view at a high resolution; a list panel that shows the results of a database query as a list of small thumbnails; and a preview panel that shows a preview of a single database item together with a textual display of the database item's properties.

The above-discussed interchangeable panels can be displayed in a primary window for displaying one or more of said interchangeable panels, or in one or more periphery windows that are smaller than said primary window.

One embodiment of the UI of the invention allows the database query results to be limited to a given number. This given number can be user specified. In the case where the query results are limited, a parallel query can be conducted whose purpose is to count the data each time a database query occurs in order to determine media dot placement and size as discussed below.

Media dots indicate how many media items are associated with a grid location on a map. Each media dot can be viewed as a scale-adaptive two dimensional histogram. In determining media dot placement and size, in one embodiment of the invention, each map is gridded with a regular grid where cell size is greater than a single pixel on a display. In one embodiment a cell size of 10 pixels was used. The diameter of the media dot varies with the number of media items it represents. In one embodiment of the UI of the invention, a media dot's diameter, d, is varied logarithmically with the number of items it represents. In this case, $$d = \begin{cases} 0 & \text{if } n = 0 \\ a\log(n) + k, & \text{otherwise} \end{cases}$$

where n is the number of items, a is a multiplicative constant, and k is the minimum size of a dot representing one item. The media dots are limited to represent database items that are at the resolution of the media dot or finer.

The UI of the invention can also include a reflective feature that shows how query constraints and query results are related through computer input device interaction. When a user passes a computer input device over any database item in a window, information related to the database item will be highlighted in other windows (e.g., constraint or display panels) containing information on that database item.

The UI of the invention allows a user to effectively and intuitively query and display media in a database that contains geo-coded database entries.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent or patent application publication with color drawing(s) will be provided by the U.S. Patent and Trademark Office upon request and payment of the necessary fee.

FIGS. 5(a) through 5(d) show a reflective UI. In FIG. 5(a) a user points at a thumbnail in the list panel. The remaining images show constraint panels doubling as informational displays: FIG. 5(b) shows a map panel—the location of a thumbnail is shown as a highlighted media dot. FIG. 5(c) depicts a timeline panel and FIG. 5(d) depicts a people panel. Moving the cursor over a dot in a constraint panel would show corresponding thumbnails highlight in the list panel.

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
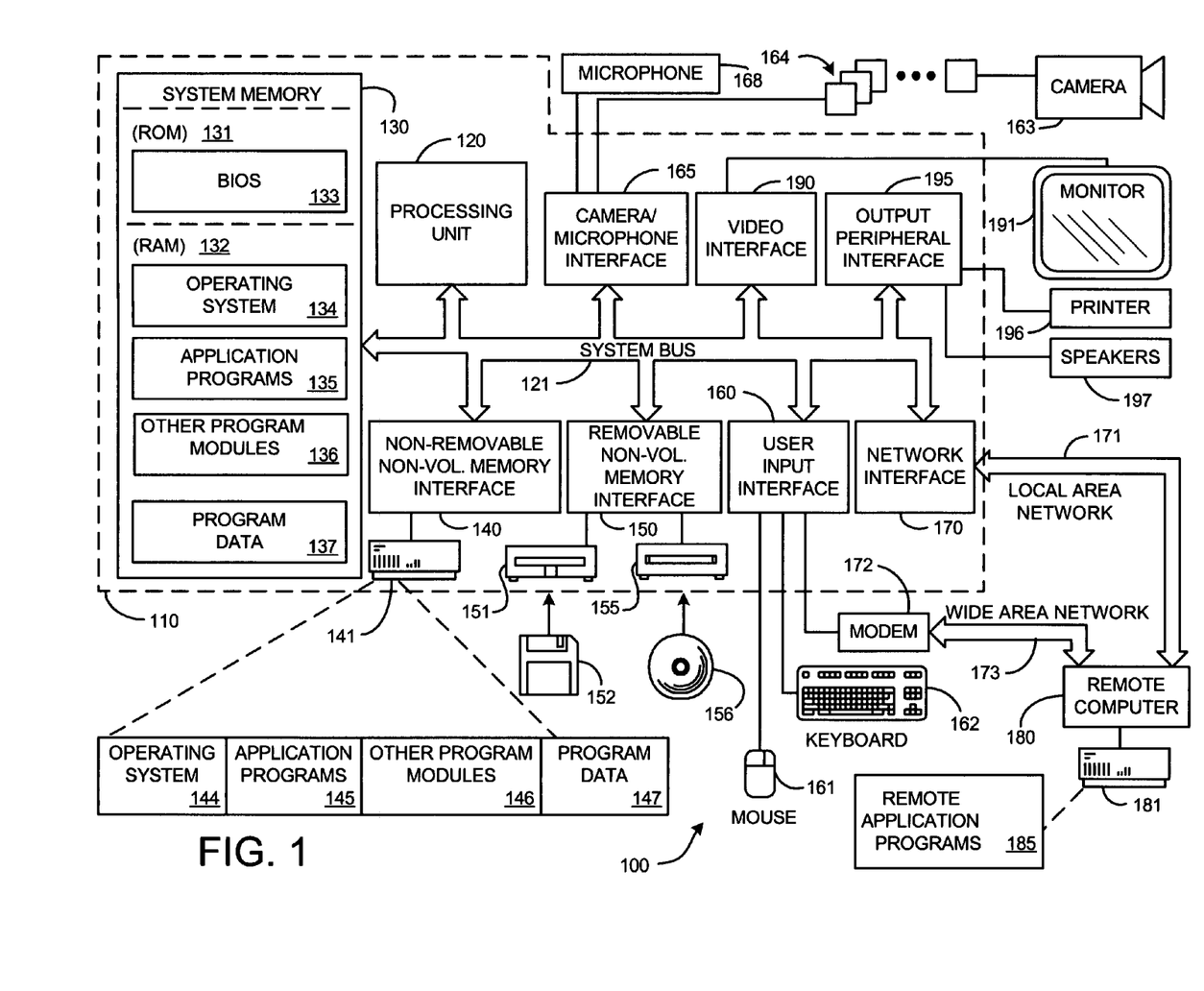
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. A microphone 168 may also be associated with the camera and input into the computer 110 with an interface 165 that is associated with one or more cameras. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Browsing User Interface for a Geocoded Media Database.

2.1 Overview.

The invention is related to a User Interface (UI) for browsing a database of media that is tagged by geographic location information. Such media can include, for example, photos, videos, panoramas, and other digital media. Each of the items in the database can also be tagged with access statistics, title, keywords, owner, the time when it was created, and so forth. Interchangeable panels can be used for determining query constraints and viewing query results. Grid-aligned media dots can be used to indicate how many media should be associated with a location on a map. The UI of the invention can also employ a reflective UI that shows how query constraints and query results are related through cursor interaction. The specifics of these components of the UI of the invention, which can be employed alone or in combination in various embodiments of the invention are described below.

2.2 Architecture.

Figure 2:
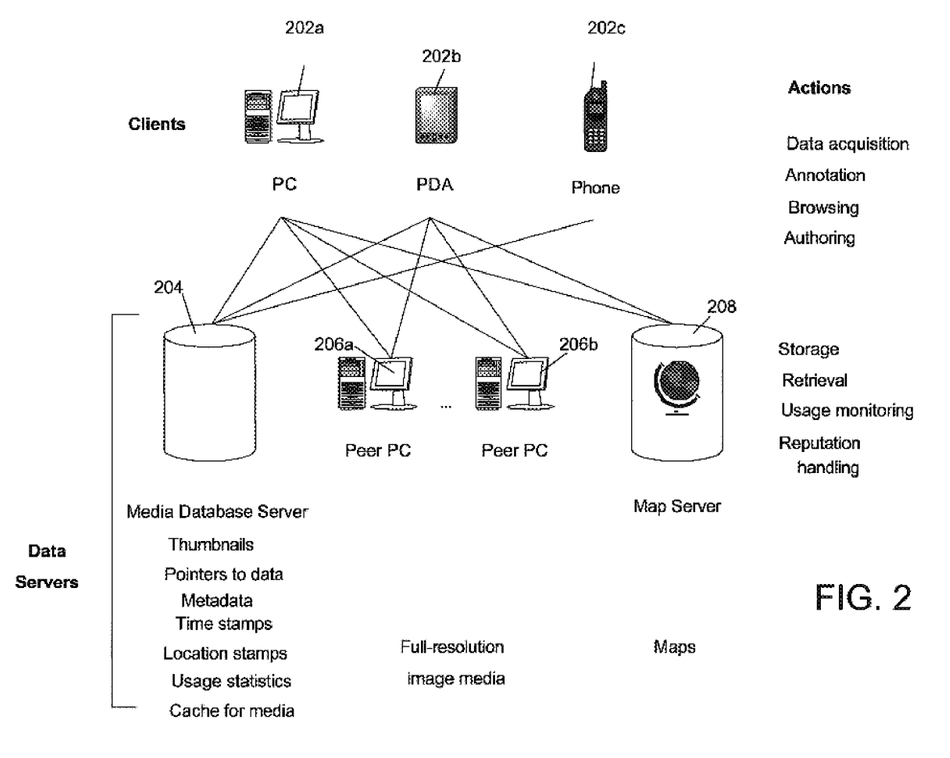
FIG. 2 shows an exemplary system wherein the UI of the invention can be practiced.

By way of example, in one embodiment of the invention, the UI of the invention resides on a client of a server-client system. Such a server-client configuration is shown in FIG. 2. The clients 202a, 202b, 202c can include, for example, a PC, a Personal Data Assistant (PDA) and even a cellular phone. This exemplary embodiment includes three types of data servers. The main media database server 204 contains a database that can store image thumbnails, pointers to full-resolution media, all relevant image metadata, and usage statistics. In this embodiment, thumbnails of images or other media, limited to less than n kilobytes each (for some pre-specified value n), are stored so that images can be browsed quickly, even when full-resolution images are unavailable. An optional cache for image media serves to store the most frequently accessed items and to act as an escrow for asynchronous transfer between peer machines in this server-client configuration. The main media database server 202 exposes an API that provides read access and restricted write access to the database and cache. Peer machines 206a, 206b provide space for full-resolution media, to keep storage requirements on the media database server itself small. Finally, one or more map servers 208 supply maps. The UI of the invention that in this case resides on clients, provides rich, intuitive user interfaces for both the production and consumption of the data on the servers. A basic set of software tools would allow for the acquisition of location-stamped images, registration of images, browsing of images, and text annotation of images.

It should be noted, however, the UI of the present invention can also be implemented in a variety of other ways. One example is on a stand-alone computer system instead of in a server-client configuration. In a stand-alone embodiment the media and map databases and full resolution media, as well as the other components, can be stored on the stand-alone device's hard drive or other storage media. In another embodiment, the server-client relationship is maintained but all media are stored on the server.

2.2 Panels.

Figure 3A:
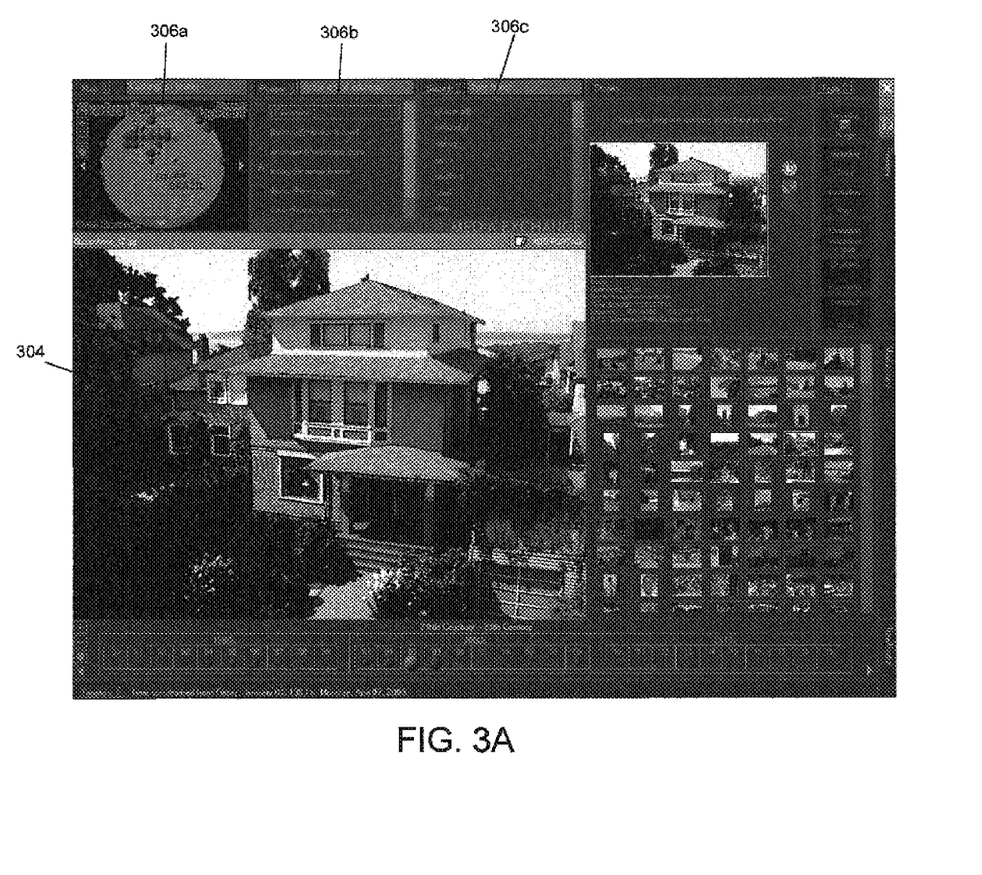
FIG. 3A is an exemplary browsing UI of the invention. A full-view panel display shows a photo in a primary window.

FIG. 3A shows a screen shot of the one exemplary embodiment of the UI of the invention. The large rectangular region offset left from center is called the primary window 304. Surrounding the primary window 304 are several peripheral windows 306a, 306b, 306c. Each of the windows hosts a panel, which can be swapped in to the primary window. In one embodiment of the invention, this swapping takes place with a mouse click on a panel's title bar. Other conventional means of window swapping can be implemented, however. When not in the primary window 304, every panel has a fixed position in the periphery where it returns. Splitting primary and peripheral tasks gives users room (in the primary window) when focusing on a single task, while maintaining a sense of the rich context (in peripheral windows).

Figure 3B:
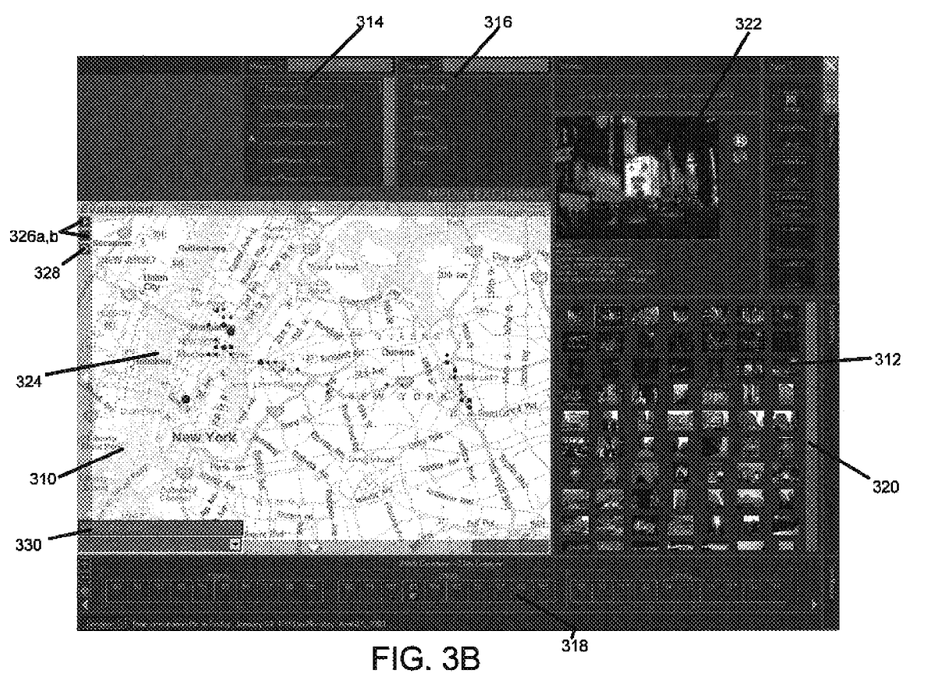
FIG. 3B is another example of the UI of the system and method according to the invention. A map panel is shown in the primary window. Thumbnails on the right show results of a query posed graphically by constraint panels.

FIG. 3B provides another configuration of the UI according to the invention. A map panel 310 is depicted in the primary window. The results of a database search are shown as thumbnail views. The constraints used are shown in panels 314 and 316 and timeline 318.

In one embodiment of the invention, each panel is either a display panel or a constraint panel. Display panels show the results of the database query that is jointly specified by the constraint panels, while constraint panels allow a user to define constraints when searching the media database. Most panels are displayed in the peripheral windows, but could be invisible, displayed via a button action, shown in the primary window, or displayed in full-screen mode.

2.2.1 Display Panels

Although many types of display panels could be implemented, there are three types of display panels in one embodiment of the invention: full-view, preview, and item list. The list panel shows the results of a database query as a list of small thumbnails 312, accompanied by a scroll bar 320. Small, tightly packed thumbnails were chosen which appear to be favored in user studies for their ability to pack a lot of information in a small space—saccades are quicker than fine manual motion. The scroll bar 320 allows access to thumbnails outside the frame.

The preview panel shows a preview of a single media item, together with a textual display of the image properties. The preview is considerably larger than the thumbnails in the list panel, but not much larger than the inherent resolution of the stored thumbnails.

Finally, in one embodiment, double-clicking either a thumbnail in the list panel or in the preview brings the item into the full-view panel at high resolution. The full-view panel is normally invisible, but when invoked, it can either appear in the primary window or occupy the full screen, depending on a keystroke toggle.

2.2.2. Constraint Panels

In one exemplary embodiment of the invention, five constraint panels were implemented, and many others are possible. These constraint panels include map, timeline, people, keyword, and media type panels. They specify constraints on the obvious corresponding media properties. The map constraint panel constrains the geography or location of the search, while the timeline constraint panel constrains the search to a specific time interval. The people constraint panel constrains the database query to a specific group of people, such as, for example, photographers or media owners. The keyword constraint panel allows the query to be constrained to certain keywords in the metadata associated with the database items. Finally, the media type constraint panel allows the database search to be constrained to a specific media type or types (e.g., photos, videos, story boards, panoramic images, interactive images, maps, and so on). So, for example, the people panel (314 of FIG. 3B) allows users to constrain queries by media owner.

In one embodiment, all constraint panels allow for a global constraint that turns off the constraint, as well as a "float" mode that allows users to navigate in the panel without eliciting a database query.

By way of example, the configuration and operation of the map panel is now described in greater detail. The other constraint panels operate in similar ways as described here. With respect to the map panel, at first glance, the map panel 324 is simply an electronic map. It displays a map. It has buttons for panning and zooming 326a, 326b. There is a "globe" button 328 for a global, zoomed-out view. There is a textbox 330 for jumping to locations by place name; and, dragging a rectangle on the map causes the map to zoom into the dragged location.

Navigation of the map, of course, changes the displayed map, but it is also tightly coupled to the media items seen in the list panel. For every new map that is displayed, a fresh query is issued to the database (barring the panel being in float mode) that is constrained to return only those media items that would be visible on the map (and which simultaneously satisfy constraints determined by the other constraint panels). For a fixed data set, the constraint panels define a unique set to be displayed in the list panel (in Section 2.5.1 an approximation to this policy is described that is necessary to make the system practical when a query returns an overwhelming number of items).

2.2.3 Authoring Panels

In one embodiment of the invention, the UI can also include authoring panels that allow a user to create new media. Such an authoring panel 322 is shown in FIG. 3B. Authoring panels may allow users to create slideshows out of media, to write e-mail messages linked to media, or otherwise create additional media-related content that requires creative input by the user.

2.3 Media Dots

There are many ways in which image media could be represented on a map, and there is ongoing research on cartographic visualizations. Cartographic visualization borrows heavily from both traditional cartography as well as from more recent advances in scientific visualizations which stress the importance of allowing pre-attentive visual cues, such as color, size, intensity, or density of iconic elements, to aid comprehension.

Figure 4:
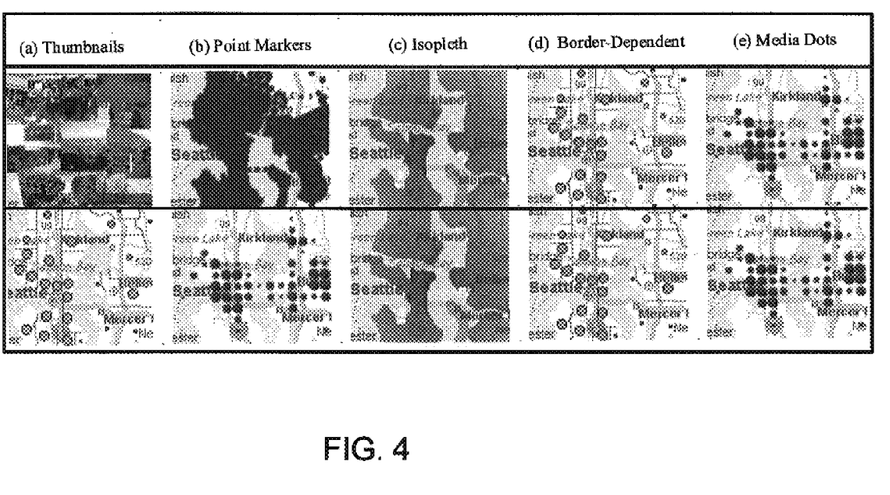
FIG. 4 shows possible displays of image items on a map. The top row shows how a few items would be displayed; the bottom row demonstrates how the display scales as number of items are increased.

As discussed in the background, there are many possibilities for representing items (e.g., photos) in the map panel. Thumbnails directly on the map (FIG. 4(a)) offer an immediate juxtaposition of image and location that is colorful and reminiscent of tourist maps, but this approach has limited location resolution. Another possibility is to represent individual items by small dots or fixed-size icons (FIG. 4(b)); precision of location information is high, and the variable density of dots conveys information about the amount of available imagery at a location. Dot maps have difficulty as the number of items increases the underlying map becomes wholly occluded, and the dots take a proportionately longer time to draw. One could use an isopleth map in which variation in hue, intensity, or saturation indicates the density of image or media items available at a location (FIG. 3(c) shows an instance of variable saturation). This solves the scaling issue, but continuous mapping does not convey the fundamental discreteness of the items being represented. In addition, it is difficult in practice to maintain a uniform look over different maps which come with varying color schemes and borders. Traditional GIS systems tend to partition a map according to political or geographical borders, assigning a value to each (FIG. 4(d)). Although highly intuitive, these methods require intimate interaction with the underlying map data, and they require additional manipulations to scale well, as geographic boundaries relevant at one scale become too small or too large at other scales.

The UI of the invention can employ what is effectively a scale-adaptive 2D histogram and can thereby provide much better results than the previously discussed ways of presenting media on a display, as shown in FIG. 4(e). Each map is gridded with a regular grid, where the cell size is greater than a single pixel (in one embodiment 10-pixel cells are used). Instead of uniform coloring, circular dots which are called media dots are overlaid at each grid point to represent a set of media items (See FIG. 4(e)). A dot's diameter, d, is varied logarithmically with the number of items it represents:

$$d = \begin{cases} 0 & \text{if } n = 0 \\ a\log(n) + k, & \text{otherwise} \end{cases}$$

where n is the number of items, a is a multiplicative constant, and k is the minimum size of a dot representing one item. This makes image density immediately apparent without losing scalability and without overwhelming the map even with large item counts. A quantitatively more accurate setting for the diameter would be to scale it with the square root of the number of items (as used in proportional symbol maps), but this quickly leads to media dots that outgrow their grid boundaries. A logarithmic scaling provides a compromise solution that preserves the relative ordering of counts of media, without strict adherence to areal proportionality. Any monotonic function that relates the size of the media dot to the number of media represented at that location, however, can be used.

Media dots only count those items that are tagged with location information at the resolution of the dot or finer. Doing so precludes imprecisely tagged media from adding to the count of items at a particular precision. As a result, for example, a photo known only to have been taken somewhere within New York City should not appear when examining the block containing the Empire State Building. It should, however, appear when viewing a map of New England.

There are a few other advantages that make the media-dot representation especially compelling. First, media dots work well in the non-map constraint panels, making the visual interface consistent throughout the client application (see FIG. 5 (Reflective UI)). Second, as discrete entities representing a finite region of the map, they afford an additional navigational mechanism—double-clicking on a media dot zooms into the region represented by the dot. Third, by using dot size to indicate density, other retinal variables, such as color or shape, can be reserved to indicate photo ownership, dot state, or other parameters.

2.4 Reflective UI

It has been shown how the constraint panels serve as a way to specify queries. They serve yet another function in displaying information about media items that the user expresses interest in.

Figure 5:
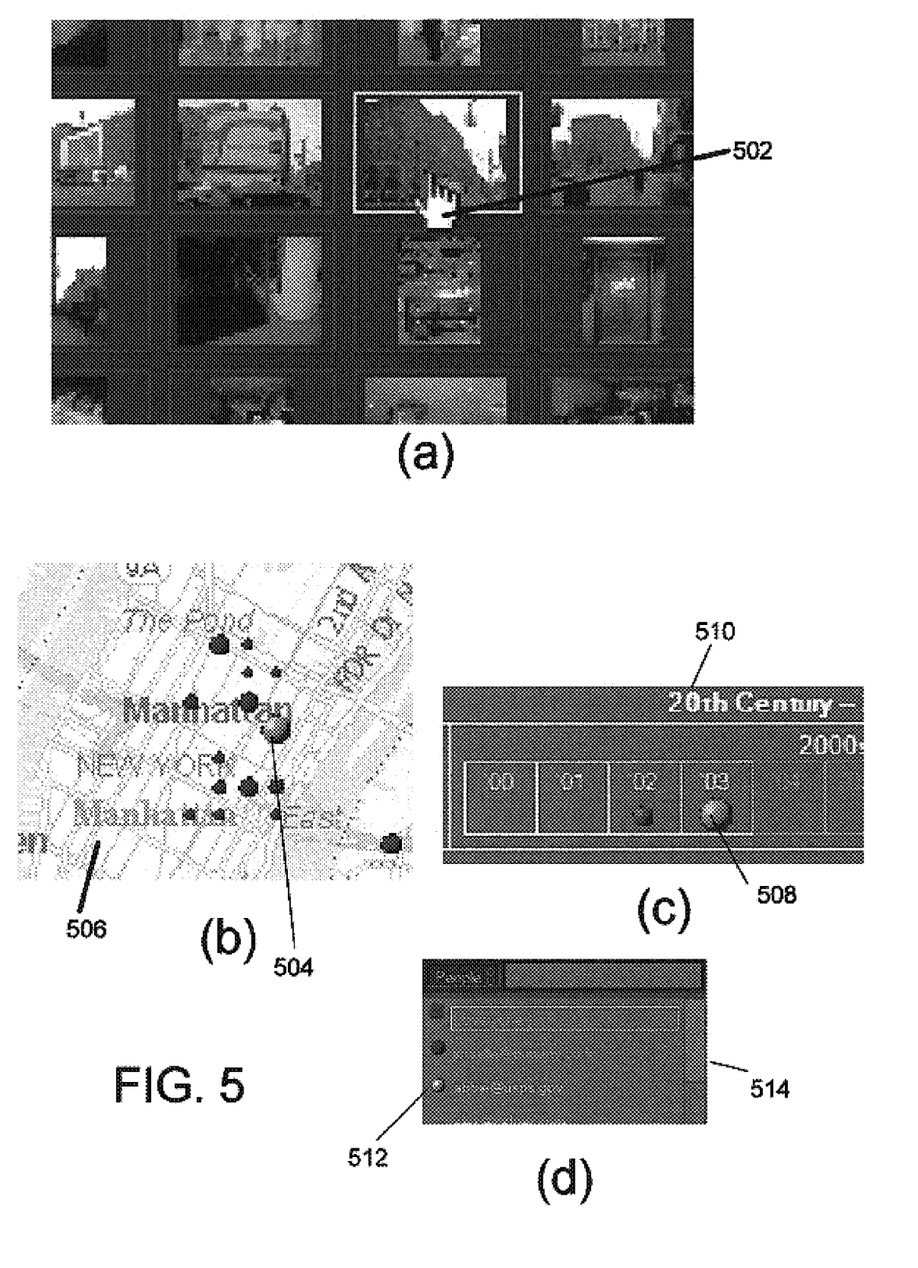

As shown in FIG. 5, when the user passes the cursor over any item's thumbnail 502 in the list panel, dots that reflect the corresponding property of the item highlight in each constraint panel (see FIG. 5(a) through 5(d)). For instance, if the item under the cursor was shot in New York City on Jan. 1, 2003, the media dot corresponding to that location 504 is highlighted on the map panel 506, the date 508 is highlighted in the timeline 510, the owner 512 is highlighted in the people panel 514, etc. Conversely, if the cursor is placed over the media dot representing New York City, all thumbnails of images taken in New York City are highlighted in the list view (as well as all corresponding dots in other constraint panels for all of the highlighted thumbnails).

This reflective UI pushes concepts in coordinated visualizations to the limit—aspects of data focused on in one panel are instantly reflected in many other panels.

2.5 Alternate Embodiments.

2.5.1 Large Query Results

Depending on the total size of the media database, a query may result in an overwhelming number of image items being returned. Aside from how users might react to the results of a naïve query such as "all photos taken anywhere in the world," the main technical challenge is in keeping queries from taking an arbitrarily long amount of time.

The simplest solution in this case works reasonably well: the number of query results are limited to a number, q, settable by the user in one working embodiment of the invention. Queries return up to the first q results of any given query. A default value of q=400 lets queries return in a second, but also fills the list panel with enough thumbnails to see.

Setting an upper bound has two consequences: First, constraint panels no longer specify a unique set of items, since there is no scheme for choosing the q results to return. This turns out to be a negligible issue that is not noticed by users who are more concerned with further refining their search.

Second, and worse, media dots on the map (and the other constraint panels) no longer show the complete set of media items that ought to be represented. This can cause UI problems, since items which ought to have been retrieved are wholly unrepresented in all panels. The solution employed in one working embodiment of the invention is to add a parallel query that occurs whenever a retrieval query takes place. This query requests just counts of data to determine media-dot placements and sizes. One can tally and cache this information (on the server side in a client-server configuration) as media are added to the database. Query speeds are small, especially compared to the time it takes to retrieve whole rows from the database.

2.5.2 Reprojection of Media Dots

Figure 6:
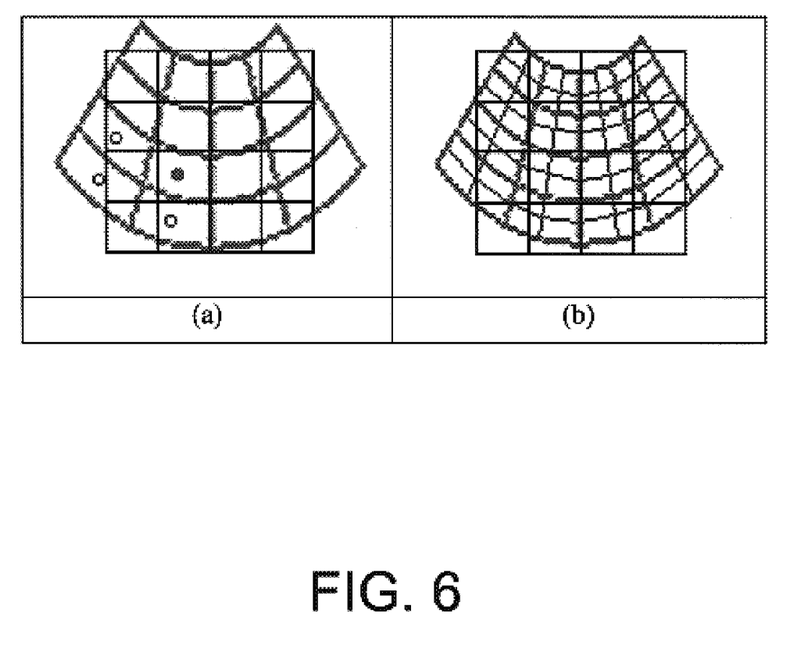
FIG. 6 depicts the forward projection of item counts (artifacts are exaggerated for exposition). The light grid indicates the source grid, and the dark grid, the destination. The solid dot in FIG. 6(a) represents the center of the light grid cell it lies in. All of the item counts represented by the solid dot would be assigned to the dark cell at row 3, column 2, where it lies. The dark cell at row 3, column 1 does not receive any counts because none of the dot centers (circles) fall within it. These problems are minimized or eliminated if the gridding of the source is chosen to be finer than the gridding of the destination FIG. 6(b).

Most maps do not use the equirectangular projection that is used to create a lat/long-precision index as discussed in copending application entitled "A SYSTEM AND METHOD EMPLOYING A GRID INDEX FOR LOCATION AND PRECISION ENCODING" filed on Sep. 26, 2003 and based on provisional application serial No. 60/469,314 filed May 9, 2003. MapPoint, for example, uses an orthographic projection, and US Geological Survey maps typically use a universal transverse mercator projection (UTM). Thus, in order to draw media dots at their proper location in databases that use equirectangular projection when determining media location, one must re-project grid units from a grid and do what is analogous to a forward mapping from 3D computer graphics, replacing the orthographic, affine, or perspective projection used in graphics with the projection used by the displayed map. This is known to have two problems as shown in FIG. 6(a)): First, infinitesimal points do not necessarily end up in the right locations; second, the projection can create "holes," when grid elements in the display are not projected onto by the projecting entity. The UI according to the invention minimizes the first problem and eliminates the second by ensuring that the source grid is sampled at a fine enough resolution with respect to the destination gridding (see FIG. 6(b)).

Wherefore, what is claimed is:

1. A graphic user interface for querying a database of media that is tagged with geographic location information and displaying the query results, comprising:

interchangeable panels that are used for determining query constraints and viewing query results of a database of media that is tagged with geographic location information, the interchangeable panels comprise one or more constraint panels and one or more display panels; and media dots that are aligned with a grid that encompasses the geographic location information of the media in the database, wherein each of said media dots has a size that varies as a function of a number of media items represented by the media dot, such that each media dot indicates how many media are associated with a grid location on the map, wherein a display panel can be one of:

a full view panel that brings a database item to full view at a high resolution;

a list panel that shows the results of a database guery as a list of small thumbnails; and a preview panel that shows a preview of a single database item together with a textual display of the database item's properties.

2. The graphics user interface of claim 1 further comprising a reflective user interface that shows how query constraints and query results are related through cursor interaction.

3. The graphics user interface of claim 1 wherein the constraint panels allow a user to define the constraints of a database query.

4. The graphics user interface of claim 1 wherein the constraint panels allow a user to define database search constraints to include one or more of:

map related to the map where a database item was captured;

timeline related to a significant event corresponding to a database item;

person related to a database item;

keyword related to a database item; and media type of a database item.

5. The graphics user interface of claim 1 wherein the display panels show the results a database query that is jointly specified by one or more constraint panels.

6. The graphics user interface of claim 5 wherein a float mode can be invoked that allows a user to navigate a constraint panel without eliciting a database query.

7. The graphic user interface of claim 5 further comprising one or more periphery windows that are smaller than said primary window for displaying one or more of said interchangeable panels.

8. The graphic user interface of claim 1 further comprising a primary window for displaying one or more of said interchangeable panels.

9. The graphic user interface of claim 1 wherein the number of query results are limited to a given number.

10. The graphic user interface of claim 9 wherein the given number is specified by a user.

11. The graphic user interface of claim 9 wherein a parallel query is conducted whose purpose is to count the data each time a database query occurs in order to determine media dot placement and size.

12. A graphic user interface for displaying data from a database of media that is tagged with geographic location information, comprising: an output device configured to display media dots that are aligned with a grid that encompasses the geographic location information of the media in the database, the media dot's diameter, d, is varied logarithmically with the number of items it represents, wherein each of said media dots has a size that varies as a function of a number of media items represented by the media dot, such that each media dot indicates how many media are associated with a grid location on the map.

13. The graphic user interface of claim 12 wherein each media dot is a scale-adaptive two dimensional histogram.

14. The graphic user interface of claim 12 wherein each map is gridded with a regular grid where cell size is greater than a single pixel on a display.

15. The graphic user interface of claim 14 wherein cell size what 10 pixels.

16. The graphic user interface of claim 12 wherein the diameter of the media dot varies with the number of media items it represents.

17. The graphic user interface of claim 12 wherein media dots are limited to represent database items that are at the resolution of the media dot or finer.

18. The graphic user interface of claim 12 where $$d \begin{cases} 0, \text{ if } n = 0 \\ a \, \log(n) + k, \text{ otherwise} \end{cases}$$

where n is the number of items, a is a multiplicative constant, and k is the minimum size of a dot representing one item.

19. A graphic user interface for querying a database of media that is tagged with geographic location information and displaying the query results, comprising:

interchangeable panels that are used for determining query constraints and viewing query results of a database of media that is tagged with geographic location information, the interchangeable panels comprise one or more constraint panels and one or more display panels; and media dots that are aligned with a grid that encompasses the geographic location information of the media in the database, wherein each of said media dots has a size that varies as a function of a number of media items represented by the media dot, such that each media dot indicates how many media are associated with a grid location on the map; and a reflective feature that shows how query constraints and query results are related through computer input device interaction wherein when a user passes a computer input device over any database item in a window, information related to the database item will be highlighted in other windows containing information on that database item, wherein a display panel can be one of:

a full view panel that brings a database item to full view at a high resolution;

a list panel that shows the results of a database query as a list of small thumbnails; and a preview panel that shows a preview of a single database item together with a textual display of the database item's properties.

* * * * *

UNITED STATES PATENT AND TRADEMARK OFFICE
CERTIFICATE OF CORRECTION

PATENT NO. : 7,475,060 B2 Page 1 of 1
APPLICATION NO. : 10/686966
DATED : January 6, 2009
INVENTOR(S) : Kentaro Toyama et al.

It is certified that error appears in the above-identified patent and that said Letters Patent is hereby corrected as shown below:

In claim 1, column 12, line 20, delete "guery" and insert --query--.

Signed and Sealed this

Tenth Day of March, 2009

JOHN DOLL
*Acting Director of the United States Patent and Trademark Office*